US009232433B2

(12) United States Patent
Subramanian et al.

(10) Patent No.: US 9,232,433 B2
(45) Date of Patent: Jan. 5, 2016

(54) DYNAMIC CODING FOR NETWORK TRAFFIC BY FOG COMPUTING NODE (71) Applicant: Cisco Technology, Inc., San Jose, CA (US)

(72) Inventors: Vijaynarayanan Subramanian, San Jose, CA (US); Douglas Chan, San Jose, CA (US); Ashok Krishnaji Moghe, Pleasanton, CA (US); Rong Pan, Saratoga, CA (US); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 45 days.

(21) Appl. No.: 14/136,062

(22) Filed: Dec. 20, 2013

(65) Prior Publication Data
US 2015/0181460 A1   Jun. 25, 2015

(51) Int. Cl.
*G01R 31/08* (2006.01)
*G06F 11/00* (2006.01)
*H04J 1/16* (2006.01)
*H04L 1/00* (2006.01)
*H04W 28/02* (2009.01)
*H04L 29/06* (2006.01)

(52) U.S. Cl.
CPC ......... *H04W 28/0273* (2013.01); *H04L 1/0009* (2013.01); *H04L 1/0041* (2013.01); *H04L 69/163* (2013.01); *H04W 28/0236* (2013.01); *H04W 28/0247* (2013.01); *H04L 2001/0092* (2013.01)

(58) Field of Classification Search
CPC ................................................ G06F 2209/508
See application file for complete search history.

(56) References Cited

U.S. PATENT DOCUMENTS

| 8,271,687 | B2 | 9/2012 | Turner et al. | |
|---|---|---|---|---|
| 2003/0231589 | A1* | 12/2003 | Itoh et al. | 370/230 |
| 2006/0250949 | A1 | 11/2006 | Ramakrishnan et al. | |
| 2006/0251010 | A1 | 11/2006 | Ramakrishnan et al. | |
| 2006/0251011 | A1 | 11/2006 | Ramakrishnan et al. | |
| 2010/0023842 | A1 | 1/2010 | Rahrer et al. | |
| 2012/0054583 | A1 | 3/2012 | Park et al. | |

(Continued)

FOREIGN PATENT DOCUMENTS

EP          2385682 A2    11/2011

OTHER PUBLICATIONS

Jiang Zhu et al. (IEEE, Mar. 25-28, 2013, Improving web sites performance using edge servers in fog computing architecture, entire document).*

(Continued)

*Primary Examiner* — Maharishi Khirodhar
(74) *Attorney, Agent, or Firm* — Leon R. Turkevich (57) ABSTRACT

In one embodiment, a method comprises determining access network conditions by a network device in an access network, the access network providing communications between a client device and a destination reachable via a data network; selecting, by the network device based on the access network conditions, one of a plurality of coding methods for network traffic between the client device and the destination, including selecting coding parameters for the one coding method; and causing, by the network device, coding to be executed on the network traffic, on behalf of the client device, according to the one coding method and the selected coding parameters.

20 Claims, 4 Drawing Sheets

(56) References Cited

U.S. PATENT DOCUMENTS

2014/0122729 A1* 5/2014 Hon et al. .................... 709/228
2014/0244804 A1* 8/2014 Ying et al. ................... 709/219

OTHER PUBLICATIONS

Talbot, "A Bandwidth Breakthrough," MIT Technology Review, Oct. 23, 2012, [retrieved on Aug. 19, 2013]. Retrieved from the Internet: <URL: http://www.technologyreview.com/news/429722/a-bandwidth-breakthrough/>, 3 pages.

Tickoo et al., "LT-TCP: End-to-End Framework to Improve TCP Performance over Networks with Lossy Channels", IEEE 13th International Workshop on Quality of Service (IEEE IWQoS 2005), University of Passau, Germany, Jun. 21-23, 2005, 18 pages.

Sundararajan et al, "Network Coding Meets TCP: Theory and Implementation," Proceedings of the IEEE, vol. 99, No. 3, Mar. 2011, pp. 490-512.

Cloud et al., RLE at MIT, Network Coding and Reliable Communications Group, [retrieved on Aug. 19, 2013]. Retrieved from the Internet: <URL: http://web.archive.org/liveweb/http://www.profheath.org/wp-content/uploads/2011/09/SecondICCPlenary2012v2-1.pdf>, pp. 1-30.

Wikipedia, "Turbo Code", Oct. 7, 2013, [retrieved on Nov. 11, 2013]. Retrieved from the Internet: <URL: http://en.wikipedia.org/w/index.php?title=Turbo_code&printable=yes>, pp. 1-6.

\* cited by examiner

DYNAMIC CODING FOR NETWORK TRAFFIC BY FOG COMPUTING NODE

TECHNICAL FIELD

The present disclosure generally relates to transport layer coding for a network-enabled device in a computing network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The use of Transmission Control Protocol (TCP) for transport of network traffic over wireless links suffers significant losses due to the inability of TCP to distinguish between losses due to channel errors versus losses due to congestion. Proposals have been advanced for reducing losses of network traffic by applying coding to the TCP layer, for example Loss Tolerant TCP (LT-TCP). The existing proposals, however, have not provided a practical solution that can be commercially implemented on a large scale.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises determining access network conditions by a network device in an access network, the access network providing communications between a client device and a destination reachable via a data network; selecting, by the network device based on the access network conditions, one of a plurality of coding methods for network traffic between the client device and the destination, including selecting coding parameters for the one coding method; and causing, by the network device, coding to be executed on the network traffic, on behalf of the client device, according to the one coding method and the selected coding parameters.

In another embodiment, an apparatus comprises a processor circuit and a device interface circuit. The processor circuit is configured for determining access network conditions in an access network, the access network providing communications between a client device and a destination reachable via a data network. The processor circuit also is configured for selecting, based on the access network conditions, one of a plurality of coding methods for network traffic between the client device and the destination, including selecting coding parameters for the one coding method. The device interface circuit is configured for causing coding to be executed on the network traffic, on behalf of the client device, according to the one coding method and the selected coding parameters.

In yet another embodiment, logic is encoded in one or more non-transitory tangible media for execution by a machine and when executed by the machine operable for: determining access network conditions by a network device in an access network, the access network providing communications between a client device and a destination reachable via a data network; selecting, by the network device based on the access network conditions, one of a plurality of coding methods for network traffic between the client device and the destination, including selecting coding parameters for the one coding method; and causing, by the network device, coding to be executed on the network traffic, on behalf of the client device, according to the one coding method and the selected coding parameters.

DETAILED DESCRIPTION

Particular embodiments enable efficient and scalable deployment of coding on network traffic in a computing network used by a client device for communication with a destination, for example via a data network, for example a local area network and/or a wide area network.

Figure 1A:
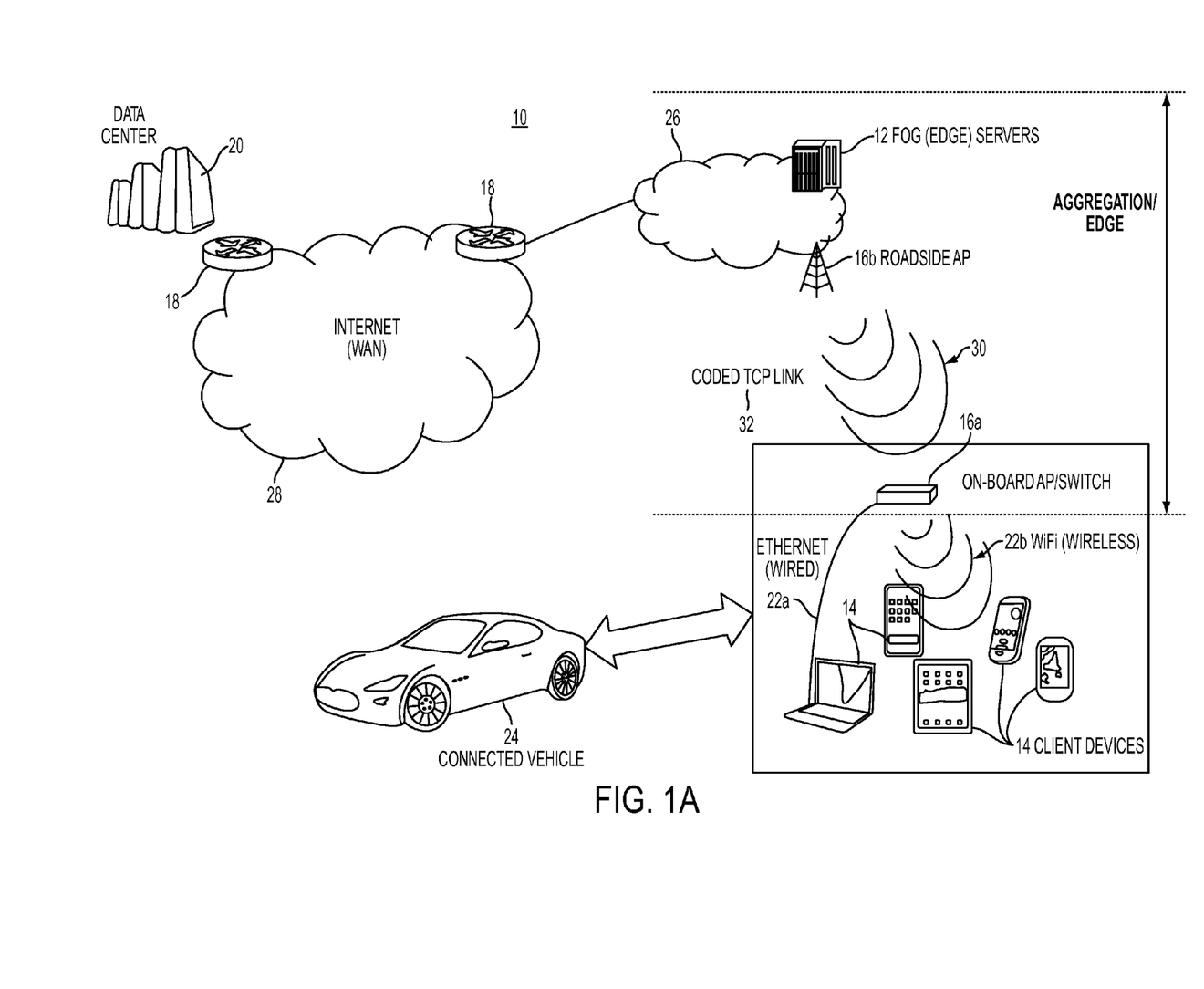
FIGS. 1A and 1B each illustrates an example system having an apparatus for selecting a coding method based on detected access network conditions, for coding of client device network traffic on behalf of the client device, according to an example embodiment.
Figure 1B:
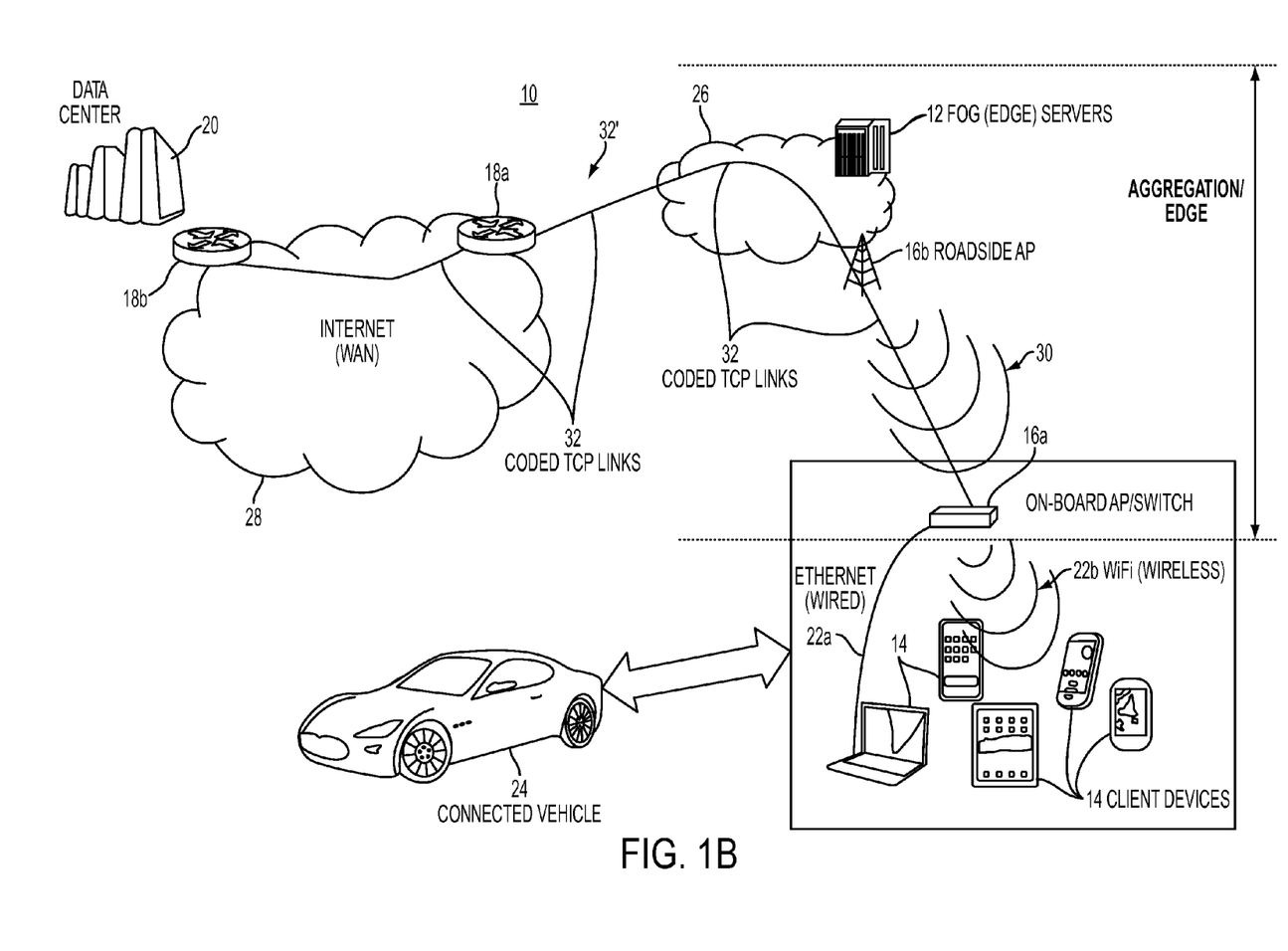

FIGS. 1A and 1B are diagrams illustrating an example network 10 having an apparatus 12 for selecting a coding method based on detected access network conditions, for coding of client device network traffic on behalf of the client device, according to an example embodiment. The apparatus 12, also referred to herein as a "fog server device", an "edge server device", or simply "network device" is a physical machine (i.e., a hardware device) configured for implementing network communications with other physical machines (e.g., client devices 14, access point devices 16, router devices 18, and/or data center server devices 20) via the network 10. Hence, the apparatus 12 is a network-enabled machine implementing network communications via the network 10.

As illustrated in FIGS. 1A and 1B, each client device 14 can have a wired data link (e.g., Ethernet) 22a and/or a wireless data link (e.g., WiFi) 22b with an access point device 16a; for example, the access point device 16a can be implemented as a mobile router providing wireless communications for a "connected vehicle" 24 to access the network 10 via a wired or wireless communication link 30 with a network access device 16b of an access network 26. The network access device 16b, implemented for example as a fixed wireless access point, can provide network access for client devices 14 and/or mobile wireless access points 16a for obtaining network services, including reaching a destination (e.g., a data center server) 20 via a wide area network 28. The destination 20 can provide various data center services, for example distributed web services, file sharing services, distributed computing services, distributed storage services, distributed application delivery and support, etc. (collectively referred to herein as "cloud computing services"). Other destination devices are reachable by a client device via the access network 26.

The access network 26 includes one or more access points 16a and/or 16b, and one or more network devices 12 that can provide fog computing services. "Fog computing" refers to providing one or more traditional cloud computing services that are associated with data center servers 20, utilizing one or more computing devices, network devices, etc. that are deployed within the access network 26, also referred to as the "fog network" 26. In other words, "fog computing" refers to providing one or more service (e.g., computing, storage, and/or networking service) in a distributed and/or virtualized manner, within the access network 26. The "fog computing" as described herein enables network edge devices (e.g., 16a, 16b) and/or network edge servers 12 to act as a "proxy" for executing operations that normally would require execution by a client device 14. Further, since the network edge devices 16a and/or 16b establish the last-hop communication links 22, 30 for a client device 14, the network edge devices 16a and/or 16b can provide access network conditions to the network edge servers 12, enabling the network edge servers 12 to determine fog computing services that are optimized for the client devices 14 based on the access network conditions, described in further detail below.

According to an example embodiment, the network device 12 can optimize communications between a client device 14 and a destination (e.g., a data center server) 20 based on determining access network conditions associated with a client device 14 accessing the access network 26 via one or more data links 22, 30. The network device 12 can select one of a plurality of coding methods for network traffic between the client device 14 and the destination 20. The network device 12 also can select one or more coding parameters associated with the selected one coding method, and cause the selected coding to be executed on the network traffic on behalf of the client device 14 according to the selected coding parameters.

As illustrated in FIG. 1A, the network device 12 can send instructions to the mobile wireless access point 16a and the fixed wireless access point 16b, causing the wireless access points 16a and 16b to act as peer endpoints for establishing a coded TCP link 32 via the wireless link 30. The wireless access points 16a and 16b can execute coding (and decoding) on TCP streams output by any one client device 14 or received by any one client device 14. Hence, a TCP stream output by a client device 14 and destined for a destination 20 can be encoded by the mobile wireless access point 16a replacing the TCP transmission, received from a client device 14, with a coded TCP transmission of encoded data packets according to the coding method selected by the edge server device 12, and outputting the coded TCP transmission onto the wireless data link 30; the coded TCP transmission of encoded data packets received by the fixed access point 16b via the wireless data link 30 can be decoded by the fixed access point 16b to recover the original TCP transmission output by the client device 14, for transport to the destination 20 via the access network 26 and the wide area network 28.

Conversely, a TCP transmission from the "destination" server device 20 and destined for a client device 14 can be replaced by the fixed access point 16b with a coded TCP transmission of encoded data packets according to the coding method and parameters chosen by the edge server device 12, and the coded TCP transmission can be output by the fixed access point 16b as a coded TCP link 32 via the wireless link 30 to the mobile access point 16a. The coded TCP transmission from the fixed access point and received via the wireless data link 30 can be decoded by the mobile access point 16a to recover the original TCP transmission output by the server device 20, for delivery of the TCP transmission to the client device 14. Hence, the access points 16a and 16b can operate as "peer endpoints" to convert between the TCP network traffic and the coded network traffic carrying the coded TCP transmission. Hence, the example embodiments enable coding to be added to a transport layer protocol transmission of network traffic (e.g., according to TCP), where the coding is optimized based on the access network conditions.

As illustrated in FIG. 1B, the network device 12 can send instructions to the mobile wireless access point 16a and another network device that serves as the corresponding peer endpoint for establishing the coded TCP connection 32' (comprising a plurality of TCP links 32) between the destination server device 20 and client device 14. For example, the network device 12 can send the coding instructions to any one of the ingress router 18a providing a connection between the access network 26 and the wide area network (WAN) 28, the egress router 18b providing a connection between the wide area network 28 and the data center, another network device in the data center, or the data center server device 20. Hence, the network device 12 can establish the coded TCP connection 32' to terminate at one end by the mobile access point 16a, and terminate at the other end by any one of the ingress router 18a, the egress router 18b, the data center server device 20, or any other network device in the data center associated with the server device 20. The peer endpoint closest to the client device 14 also can terminate at a different network device distinct from the client device 14 or the mobile wireless access point 16a, for example the fixed wireless access point 16b or a router device within the access network 26, based on determining the wireless data link 30 suffers minimal data loss, described below.

Hence, the example embodiments enable the network device 12 to cause coding to be executed by a network device distinct from the client device 14 using a coding method (and coding parameters) chosen by the network device 12 based on determined access network conditions. The network device 12 causing coding to be executed on behalf of the client device 14 eliminates the necessity of any modification of any client device 14 (e.g., modifying the TCP stack in the client device 14 by inserting a coding layer between the TCP layer 3 stack and the Internet Protocol (IP) layer 2 stack), since the coding is executed by another network device acting as a "proxy" coding device. Hence, any modification to a TCP stack (e.g., inserting an executable coding layer in between the TCP layer 3 stack and the IP layer 2 stack) can be implemented in the peer endpoints (e.g., 16a and 16b of FIGS. 1; 16a and 18b of FIG. 2).

The example embodiments also eliminate the need for a client device 14 to allocate considerable device resources (e.g., CPU processing capacity, memory device storage capacity, etc.) to execute coding. Different coding methods (e.g., Reed Solomon, Turbo coding, network coding, XOR coding) having varying computational resource requirements, and executing coding on data streams can be computationally intensive. Further, client devices (e.g., laptop devices, intelligent phones, intelligent tablet pads, etc.) 14 have scaled down computing power (CPU processing capacity or memory capacity) compared to network devices deployed within a network infrastructure within the access network 26 and/or the wide area network 28; further, client devices 14 often are power constrained to be operated only on battery power. Hence, the example embodiments enable the coding to be executed in network devices deployed in the networks 26 and/or 28 and optimized for executing computationally-intensive network services operations such as coding.

The example embodiments also provide flexibility in selecting the coding method that should be applied to a particular TCP transmission stream. As described in further detail below, the network device 12 can choose between different coding methods (e.g., XOR coding, Reed Solomon, Turbo coding, network coding, etc.) based on detected network conditions including the loss rate on the data channels in the access network (e.g., data link 30), policy based values including policy associated with a client device and/or a TCP transmission stream, relative to the available processing capacity of the network device that need to execute the coding. Hence, the network device 12 can balance the relative coding requirements with the available processing resources to choose the coding method to be used, as well as the coding parameters to be used for the chosen coding method.

The example embodiments enable coding for network traffic transmitted according to connection-oriented protocols such as TCP, Stream Control Transmission Protocol (SCTP), etc., where use of a reverse channel with two-way communication enables peer endpoints to negotiate the coding method and/or encoding parameters, where the apparatus 12 can identify prescribed coding methods and/or parameters that can be negotiated between peer endpoints. The negotiation between the peer endpoints can be implemented using in-band signaling (within the data stream, for example a header identifying encoding method and parameters) or out-of-band signaling (e.g., using a separate control channel for negotiation); out-of-band signaling also can be used for encoding network traffic transmitted according to connection-less protocols (e.g., UDP).

Hence, the example embodiments enable a coding method to be dynamically selected for coding of network traffic (e.g., connection-oriented or connectionless) on behalf of a client device outputting the network traffic. The coding of network traffic can use forward error correction (FEC) (e.g., Reed Solomon, Turbo Coding, network coding, XOR coding, etc.) to add redundancy to a flow of network traffic to address any loss of data packets. The redundancy provided by forward error correction enables the repair of any data packets that are lost or corrupted during transmission through a network medium. Hence, FEC-based coding of network traffic can reduce or eliminate the necessity for retransmitting a lost/corrupted data packet. Other coding methods also could be used that do not employ FEC, for example sending redundant copies of a data packet to protect against possible lost/corrupted data packets. For reliable protocols, this avoids the need for retransmission while trading off higher bandwidth use for protection against lost/corrupted data packets.

Figure 2:
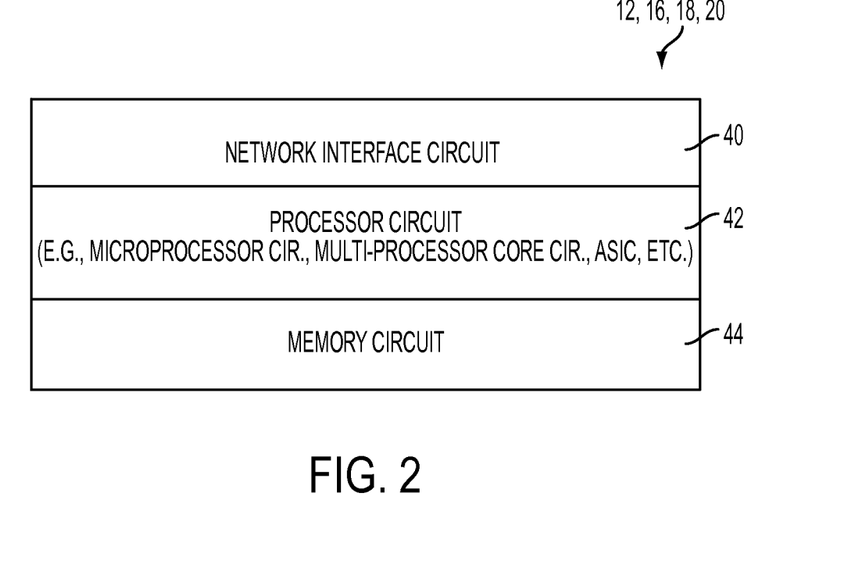
FIG. 2 illustrates an example implementation of any one of the network devices of FIG. 1, according to an example embodiment.

FIG. 2 illustrates an example implementation of any one of the network devices 12, 16*a*, 16*b*, 18, or 20 of FIG. 1, according to an example embodiment. Each network device 12, 16*a*, 16*b*, 18, and/or 20 can include a network interface circuit 40, a processor circuit 42, and a memory circuit 44. The network interface circuit 40 can include one or more distinct physical layer transceivers for communication with any other network device that is reachable via a wired or wireless data link; the network interface circuit 40 also can include an IEEE based Ethernet transceiver for communications with the devices of FIG. 1 via a wired Ethernet link, and/or a fiber optic transceiver, etc. The processor circuit 42 can be configured for executing any of the operations described herein, and the memory circuit 44 can be configured for storing any data or data packets as described herein, for example storage of data packets in a buffer.

Any of the disclosed circuits of the network devices 12, 16, 18, or 20 (including the network interface circuit 40, processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC) or any custom designed integrated circuit. Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 40) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a nonvolatile memory such as a programmable read only memory (PROM) or an EPROM, and/or a volatile memory such as a DRAM, SRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network device via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
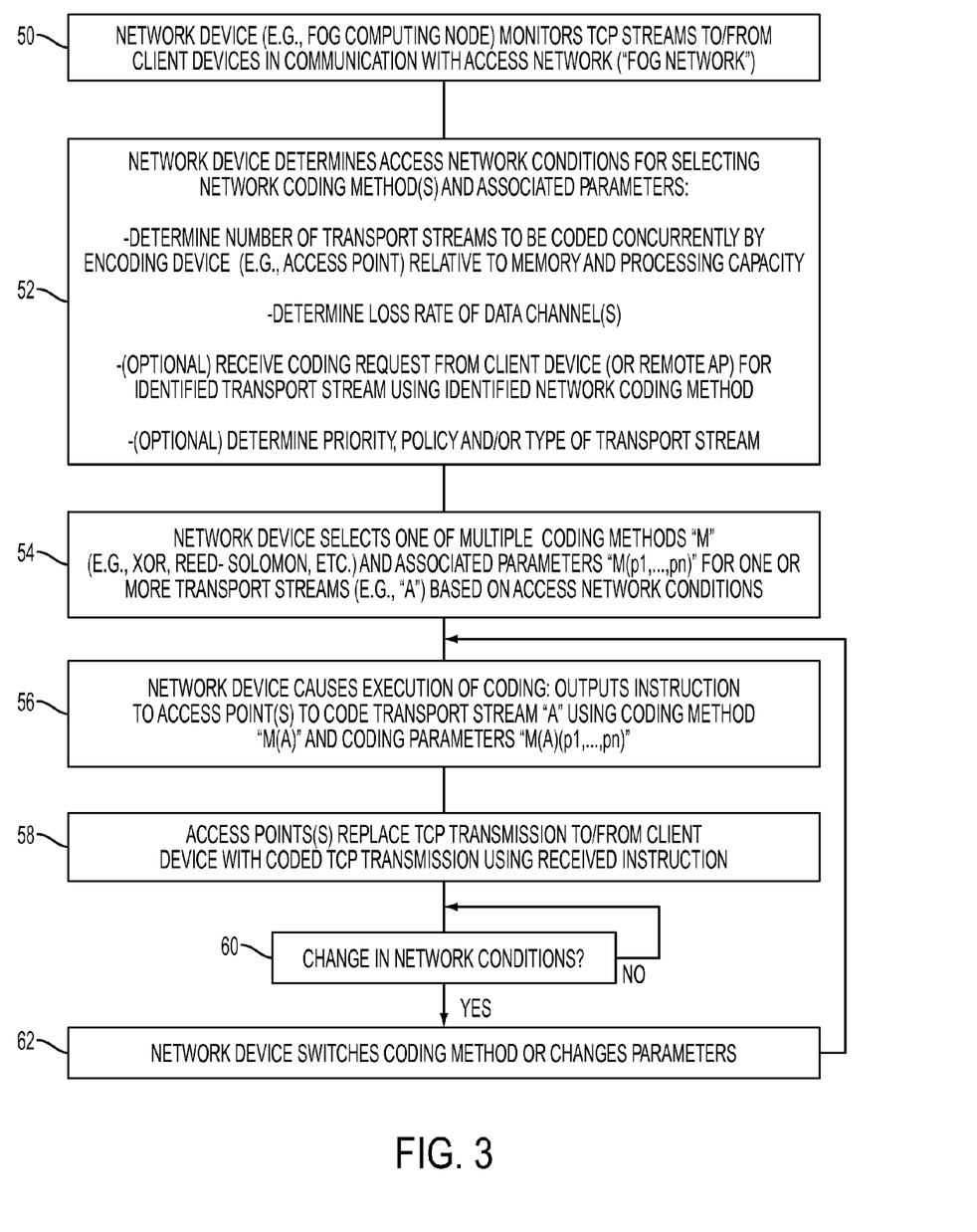
FIG. 3 illustrates an example method of selecting a coding method on behalf of a client device, according to an example embodiment.

FIG. 3 illustrates an example method of selecting a coding method on behalf of a client device, according to an example embodiment. The operations described with respect to FIG. 3, or any of the other Figures, can be implemented as executable code stored (in encrypted or unencrypted form) on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-3 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The processor circuit 42 of the network device 12 is configured for monitoring, in operation 50, TCP streams to or from client devices 14 that are in communication with the access network 26. For example, each access point 16 and/or each router device receiving incoming traffic from an edge router (e.g., 18a of FIG. 1) can send a notification to the network device 12 of a new TCP stream.

The processor circuit 42 of the network device 12 in operation 52 can determine access network conditions in order to select a coding method for a new TCP stream, and associated coding parameters. For example, the processor circuit 42 can determine the number of transport streams that need to be coded concurrently by an encoding device, relative to the memory and processing capacity of the corresponding encoding device: as illustrated with respect to FIG. 1A or 1B, the processor circuit 42 of the network device 12 can determine that the mobile access point 16a may need to concurrently code TCP streams for five (5) client devices 14. The processor circuit 42 of the network device 12 also can determine in operation 52, as one of the access network conditions, a loss rate for at least one data channel 30 used for transport of the network traffic between a client device 14 and a destination 20; as described previously with respect to FIG. 1B, the processor circuit 42 of the network device 12 can receive network performance information for any data link in the access network 26 (and/or the WAN 28) from a corresponding network device (e.g., an access point and/or a router device), including bandwidth data rate, bit error rate, loss rate (e.g., as a percentage of lost data), etc.

The processor circuit 42 of the network device 12 also can receive (via the corresponding device interface circuit 40) a coding request originated from a client device 14, an access point 16, an edge router 18a or 18b, and/or the "destination" device 20, where the coding request can specify an identified coding method for an identified TCP transport stream. The processor circuit 42 of the network device 12 also can optionally determine whether the transport stream has an identifiable priority (e.g., identifying high-priority network traffic), an identifiable policy (e.g., whether a prescribed level of protection and/or quality of service is guaranteed relative to other available levels of protection or quality of service), or an identifiable type (e.g., streaming media, file transfer, web page requests and responses, text messages, etc.). Hence, the processor circuit 42 of the network device 12 may conclude that a particular client device 14 (e.g., the laptop connected via the wired connection 22a) requires a higher protection rate compared to the other client devices in communication with the wireless access point 16a.

The processor circuit 42 of the network device 12 can select in operation 54 one of multiple coding methods for one or more TCP transport streams based on the determined access network conditions. In particular, the processor circuit 42 can analyze, for a given TCP stream "A" the desired (or required) level of acceptable loss rate based on transport stream type, priority, policy, identification of the wireless client device 14, etc. The processor circuit 42 also can analyze the loss rate of the one or more data channels 30 to be used for transporting the TCP stream between the client device 14 and the corresponding destination device 20: as described previously, the processor circuit 42 can detect the loss rate of one or more data channels 30 in the access network 26, for example in the form of a packet drop rate detected by an access point 16b with a corresponding client 16a. The processor circuit 42 also can perform more advanced network performance operations with respect to the access network 26, including detecting data rate variations, the distribution of data rate variations, etc. Hence, the processor circuit 42 of the network device 12 can apply more advanced traffic engineering techniques to determine the current health and condition of the access network 26. The processor circuit 42 of the network device 12 also can compare the desired level of acceptable loss rate for the given TCP stream "A" and the access network conditions (e.g., the current health and condition of the access network 26 and its associated data links 30) with the relative capacity of the coding endpoints (e.g., 16a and 16b) that are to execute the selected coding method on behalf of the client device 14; hence, the processor circuit 42 of the network device 12 may choose a less robust coding method (e.g., exclusive-OR (XOR) coding) if a given coding endpoint (e.g., 16a) has a relatively small amount of available processing capacity for another coded TCP stream.

Hence, the processor circuit 42 of the network device 12 can select in operation 54 one of multiple coding methods "M" for a given TCP stream "A", for example exclusive-OR (XOR) coding, Reed Solomon coding, Turbo coding, network coding, Streaming Network Coding as described in U.S. Pat. No. 8,271,687, etc., based on the access network conditions which can include the relative capacity of the access point executing the coding. The processor circuit 42 of the network device 12 also can determine from a prescribed resource whether any new coding methods are available relative to a prescribed list of registered coding methods maintained by the network device 12: assuming a new coding method is available, the processor circuit 42 can update its prescribed list of registered coding methods for notification to the network devices executing the coding on behalf of a client device 14.

The processor circuit 42 of the network device 12 also can choose the associated parameters "M(p)" for the chosen coding method "M". Example parameters that can be chosen for Reed Solomon-based encoding can include the number "n" of data blocks "B" that are being encoded to generate a linear combination "P(i)", and a set "$x_{ij}$" of randomized coefficients used to generate the linear combination "P(i)", as described in Equation (1) of U.S. Pat. No. 8,271,687. Example parameters that can be chosen for Streaming Network Coding as described in U.S. Pat. No. 8,271,687 can include the number "n" of data blocks to be encoded to generate differentially-encoded data blocks "P(i)", and a randomization seed "$seed_N$".

The network interface circuit 40 of the network device 12 in operation 56 can cause execution of coding on the network traffic according to the selected coding method "M" and the associated coding parameters "M(p)", for example based on outputting an instruction to the access points 16a and 16b to code the identified transport stream "A" using the identified coding method "M(A)" using the coding parameters "M(A)(p1, . . . , pn)", enabling the access points 16a and 16b of FIG. 1A to replace in operation 58 the TCP transmission with coded TCP (e.g., network-coded TCP (NC-TCP)) transmission using the received instruction. As illustrated with respect to FIG. 1B, an instruction alternately can be sent to another network device along the path 32' between the client device 14 and the data center device 20, for example the routers 18a or 18b in the wide-area network, an edge router of the access network 26 in communication with the edge router 18a, or an internal router device within the access network 26. In another embodiment, the network device 12 also can execute the coding as described herein, enabling the network interface circuit 12 of the network device 12 to cause execution of the coding based on receiving the (uncoded) TCP transmission and/or outputting the NC-TCP transmission. The instruction also can include a reference for retrieving executable code associated with executing the identified coding method, for example in the form of a uniform resource identifier (URI) if the identified coding method is a newly-registered coding method.

The processor circuit 42 of the network device 12 also can respond to a detected change in network conditions in operation 60 by switching the coding method "M" and/or one or more of the associated parameters in operation 62. For example, the processor circuit 42 in operation 60 can detect a change relative to any of the identified network conditions as described above with respect to operation 52, including an improvement or deterioration in loss rates, an increase or decrease in the number of transport streams concurrently coded by an encoding device, a coding request change from a client device or another network device, or a change in priority and/or policy (e.g., by a network administrator). Hence, the network device 12 can dynamically adjust to changes in the network in order to provide optimized coding at the transport layer: example coding can include forward error correction (FEC) based coding (e.g., Reed Solomon, Turbo coding, network coding, etc.).

According to example embodiments, different encoding schemes can be dynamically applied to different TCP flows based on an apparatus determining access network conditions within an access network relative to client device requirements and the relative capacity of the network devices acting as a proxy for executing coding on behalf of the client device. Hence, coding can be applied to TCP streams (or UDP streams) for a client device, without any modification or adverse effect of the client device. Further, different encoding schemes can be chosen for varying network conditions, providing dynamic optimization of the coding within the access network. Different coding methods also can be dynamically applied within an access network 26 based on registering the coding method within the access network 26, and sending instructions to the appropriate network devices (e.g., access points 16a, 16b) to retrieve the coding method for execution (e.g., from a prescribed storage location identified by the network device 12, for example in the form of a uniform resource identifier). For example, a coding method can be utilized that adds forward error correction to IP flows instead of TCP flows.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining access network conditions by a network device in an access network, the access network providing communications between a client device and a destination reachable via a data network;
   selecting, by the network device based on the access network conditions, one of a plurality of coding methods for network traffic between the client device and the destination, including selecting coding parameters for the one coding method; and
   causing, by the network device, coding to be executed on the network traffic, on behalf of the client device, according to the one coding method and the selected coding parameters;
   wherein the causing includes the network device outputting, to an access point in the access network, an instruction specifying the one coding method and the selected coding parameters, enabling the access point to convert between the network traffic and coded network traffic in response to the instructions.

2. The method of claim 1, wherein:
   the access point is a fixed wireless access point;
   the causing including the network device outputting the instruction to the fixed wireless access point and a mobile access point in communication with the fixed wireless access point via a wireless data link, enabling the fixed wireless access point and the mobile access point to establish the coded network traffic across the wireless data link.

3. The method of claim 1, wherein the access point is a mobile access point in a connected vehicle, enabling the coded network traffic to be transmitted between the mobile access point and the destination via the data network.

4. The method of claim 1, wherein the causing of coding to be executed includes replacing Transmission Control Protocol (TCP) transmission of the network traffic with coded-TCP transmission of encoded data packets according to the one coding method, the coding method including any one of a forward error correction (FEC) coding or network coding.

5. The method of claim 1, wherein the determining includes receiving a coding request from the client device for executing the coding using an identified method specified in the request, for an identified transport stream.

6. The method of claim 1, wherein the causing includes switching the coding to be executed from the one coding method on at least one identified transport stream of the network traffic, or changing the selected coding parameters, in response to a detected change in the access network conditions.

7. The method of claim 6, wherein the determining of access network conditions includes at least one of:
   determining a number of transport streams that need to be coded concurrently, relative to at least one of a memory capacity or a processing capacity of an encoding device used to execute the coding;
   determining a loss rate of at least one data channel used for transport of the network traffic between the client device and the destination; or
   determining a priority of the at least one identified transport stream.

8. The method of claim 7, wherein the switching includes changing the selected coding parameters on the at least one identified transport stream based on any one of the corresponding loss rate, the corresponding priority, or a change in the number of transport streams that need to be coded concurrently.

9. An apparatus comprising:
   a processor circuit comprising one or more integrated circuits and configured for:
   determining access network conditions in an access network, the access network providing communications between a client device and a destination reachable via a data network, and
   selecting, based on the access network conditions, one of a plurality of coding methods for network traffic between the client device and the destination, including selecting coding parameters for the one coding method; and a device interface circuit comprising one or more integrated circuits and configured for causing coding to be executed on the network traffic, on behalf of the client device, according to the one coding method and the selected coding parameters;

wherein the causing includes the network device outputting, to an access point in the access network, an instruction specifying the one coding method and the selected coding parameters, enabling the access point to convert between the network traffic and coded network traffic in response to the instructions.

10. The apparatus of claim 9, wherein:
the access point is a fixed wireless access point;
the causing including the network device outputting the instruction to the fixed wireless access point and a mobile access point in communication with the fixed wireless access point via a wireless data link, enabling the fixed wireless access point and the mobile access point to establish the coded network traffic across the wireless data link.

11. The apparatus of claim 9, wherein the access point is a mobile access point in a connected vehicle, enabling the coded network traffic to be transmitted between the mobile access point and the destination via the data network.

12. The apparatus of claim 9, wherein the causing of coding to be executed includes replacing Transmission Control Protocol (TCP) transmission of the network traffic with coded-TCP transmission of encoded data packets according to the one coding method, the coding method including any one of a forward error correction (FEC) coding or network coding.

13. The apparatus of claim 9, wherein the determining includes receiving a coding request from the client device for executing the coding using an identified method specified in the request, for an identified transport stream.

14. The apparatus of claim 9, wherein the causing includes switching the coding to be executed from the one coding method on at least one identified transport stream of the network traffic, or changing the selected coding parameters, in response to a detected change in the access network conditions.

15. The apparatus of claim 14, wherein the determining of access network conditions includes at least one of:
determining a number of transport streams that need to be coded concurrently, relative to at least one of a memory capacity or a processing capacity of an encoding device used to execute the coding;
determining a loss rate of at least one data channel used for transport of the network traffic between the client device and the destination; or
determining a priority of the at least one identified transport stream.

16. The apparatus of claim 15, wherein the switching includes changing the selected coding parameters on the at least one identified transport stream based on any one of the corresponding loss rate, the corresponding priority, or a change in the number of transport streams that need to be coded concurrently.

17. Logic encoded in one or more non-transitory tangible media for execution by a machine and when executed by the machine operable for:
determining access network conditions by a network device in an access network, the access network providing communications between a client device and a destination reachable via a data network;
selecting, by the network device based on the access network conditions, one of a plurality of coding methods for network traffic between the client device and the destination, including selecting coding parameters for the one coding method; and
causing, by the network device, coding to be executed on the network traffic, on behalf of the client device, according to the one coding method and the selected coding parameters;
wherein the causing includes the network device outputting, to an access point in the access network, an instruction specifying the one coding method and the selected coding parameters, enabling the access point to convert between the network traffic and coded network traffic in response to the instructions.

18. The logic of claim 17, wherein:
the access point is a fixed wireless access point;
the causing including the network device outputting the instruction to the fixed wireless access point and a mobile access point in communication with the fixed wireless access point via a wireless data link, enabling the fixed wireless access point and the mobile access point to establish the coded network traffic across the wireless data link.

19. The logic of claim 17, wherein the access point is a mobile access point in a connected vehicle, enabling the coded network traffic to be transmitted between the mobile access point and the destination via the data network.

20. The logic of claim 17, wherein the causing of coding to be executed includes replacing Transmission Control Protocol (TCP) transmission of the network traffic with coded-TCP transmission of encoded data packets according to the one coding method, the coding method including any one of a forward error correction (FEC) coding or network coding.

* * * * *